United States Patent
Weber et al.

(10) Patent No.: US 7,243,264 B2
(45) Date of Patent: Jul. 10, 2007

(54) METHOD AND APPARATUS FOR ERROR HANDLING IN NETWORKS

(75) Inventors: Wolf-Dietrich Weber, San Jose, CA (US); Chien-Chun Chou, San Jose, CA (US); Jeffrey Allen Ebert, Half Moon Bay, CA (US); Stephen W. Hamilton, Los Gatos, CA (US); Michael J. Meyer, Palo Alto, CA (US)

(73) Assignee: Sonics, Inc., Mountain View, CA (US)

( * ) Notice: Subject to any disclaimer, the term of this patent is extended or adjusted under 35 U.S.C. 154(b) by 531 days.

(21) Appl. No.: 10/285,987

(22) Filed: Nov. 1, 2002

(65) Prior Publication Data

US 2004/0088607 A1    May 6, 2004

(51) Int. Cl.
G06F 11/00 (2006.01)
(52) U.S. Cl. ...................................... 714/25
(58) Field of Classification Search ............... 714/10, 714/50, 55
See application file for complete search history.

(56) References Cited

U.S. PATENT DOCUMENTS

| | | | | |
|---|---|---|---|---|
| 4,321,666 A | * | 3/1982 | Tasar et al. | 714/10 |
| 4,872,165 A | * | 10/1989 | Mori et al. | 714/4 |
| 4,933,940 A | * | 6/1990 | Walter et al. | 714/10 |
| 5,280,515 A | * | 1/1994 | Nagatsu | 348/14.08 |
| 5,487,148 A | * | 1/1996 | Komori et al. | 714/4 |
| 5,928,368 A | * | 7/1999 | Jardine et al. | 714/22 |
| 5,948,089 A | | 9/1999 | Wingard et al. | |
| 6,073,251 A | * | 6/2000 | Jewett et al. | 714/7 |
| 6,115,763 A | * | 9/2000 | Douskey et al. | 710/72 |
| 6,182,183 B1 | | 1/2001 | Wingard et al. | |
| 6,249,893 B1 | * | 6/2001 | Rajsuman et al. | 714/741 |
| 6,330,225 B1 | | 12/2001 | Weber et al. | |
| 6,622,260 B1 | * | 9/2003 | Marisetty et al. | 714/10 |
| 6,651,242 B1 | * | 11/2003 | Hebbagodi et al. | 717/127 |
| 6,725,313 B1 | | 4/2004 | Wingard et al. | |
| 6,880,133 B2 | | 4/2005 | Meyer et al. | |
| 6,907,548 B2 | * | 6/2005 | Abdo | 714/43 |
| 6,938,183 B2 | * | 8/2005 | Bickel | 714/12 |
| 6,948,105 B2 | * | 9/2005 | Rajsuman | 714/724 |
| 6,990,609 B2 | * | 1/2006 | Wiley et al. | 714/25 |
| 7,080,283 B1 | * | 7/2006 | Songer et al. | 714/30 |
| 2003/0208566 A1 | | 11/2003 | Weber et al. | |

OTHER PUBLICATIONS

Wingard, Drew: "Sonics SOC Integration Architecture", Sonics, Inc., 1500 Presentation, 1999, 25 pages, www.OCP-IP.org.
"Open Core Protocol Specification", OCP International Partnership, Release 1.0, 2001.

* cited by examiner

*Primary Examiner*—Robert Beausoliel
*Assistant Examiner*—Elmira Mehrmanesh
(74) *Attorney, Agent, or Firm*—Blakely Sokoloff Taylor & Zafman LLP (57) ABSTRACT

A method and apparatus for error handling in networks have been described. The method configures a plurality of cores, wherein each core is connected with and associated with each of one of a plurality of initiators. The method further connects one or more of the initiators to a network. Next, one or more of the initiators determine an error in one or more of the cores and communicate the error.

24 Claims, 9 Drawing Sheets

Division of responsibility for error handling

| Hardware | Software |
|---|---|
| <ul><li>detects errors</li><li>notifies software</li><li>logs information about the errors</li><li>provides mechanisms to support clean-up</li><li>isolates error core from rest of system</li></ul> | <ul><li>is notified by harware</li><li>determines the location and type of error</li><li>decides whether recovery is possible</li><li>uses hardware support mechanisms to clean-up error and bring core back on-line</li></ul> |

Table 1

FIG. 4

Error isolation by agent

Central error notification

Hardware support for software clean-up

| | |
|---|---|
| Access to Agent Status (902) | Makes current status of agent, such as resources locked and requests in progress, available in software readable registers |
| Agent reject control (904) | Software write of a register causes the agent to reject new requests |
| Agent/core reset (906) | Software write of a register causes the agent and attached core to be reset without affecting the rest of the system |

Table 2

FIG. 9

METHOD AND APPARATUS FOR ERROR HANDLING IN NETWORKS

FIELD OF THE INVENTION

The present invention pertains to networks. More particularly, the present invention relates to a method and apparatus for error handling in networks.

BACKGROUND OF THE INVENTION

Networks cover a wide range of connectivity. There are Wide Area Networks (WANs), such as the Internet, Local Area Networks (LANs), such as within a small office, and micro-networks (μNetworks), such as on an integrated circuit (IC) chip.

The term μNetwork is used to describe on-chip networks that are used to connect intellectual property (IP) cores such as processors, digital signal processors (DSPs), memory systems, and peripherals into a functioning computer system. It is beneficial for such a system to have well-defined error handling properties. In particular, in some systems it may be required that parts of the system can continue unaffected by errors in other parts of the system, and that such errors may be corrected and the system brought back to full functionality without requiring a full system shut-down or reset. The present invention deals with error handling in networks and μNetworks. The present invention discloses partitioning the task between hardware and software, and what specific hardware mechanisms may be needed in a μNetwork in order to allow error isolation and recovery.

BRIEF DESCRIPTION OF THE DRAWINGS

The present invention is illustrated by way of example and not limitation in the figures of the accompanying drawings, in which like references indicate similar elements and in which.

DETAILED DESCRIPTION

A method and apparatus for error handling in networks are described.

Figure 1:
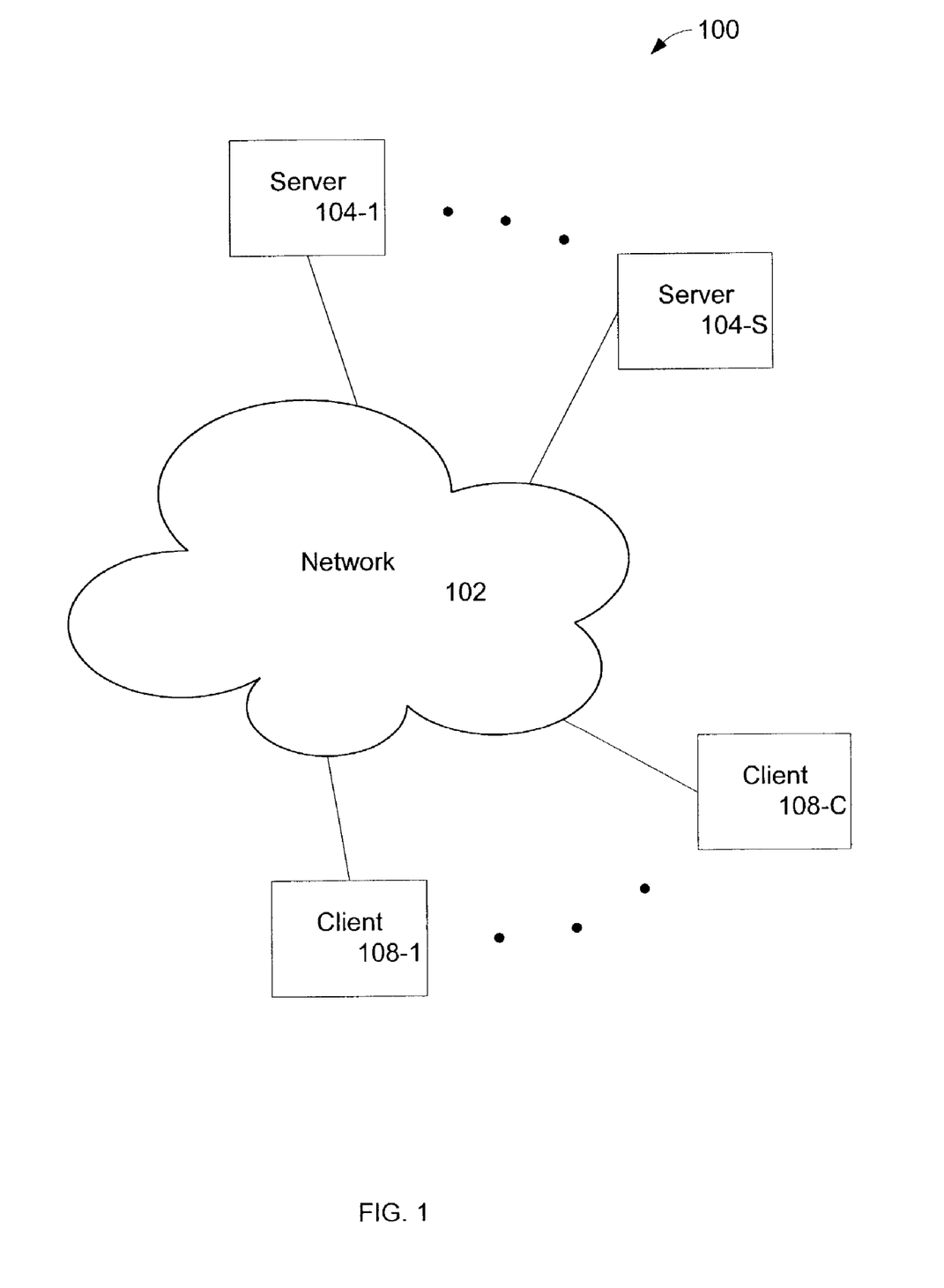
FIG. 1 illustrates a network environment in which the method and apparatus of the present invention may be implemented.

FIG. 1 illustrates a network environment 100 in which the techniques described may be applied. The network environment 100 has a network 102 that connects S servers 104-1 through 104-S, and C clients 108-1 through 108-C. More details are described below.

Figure 2:
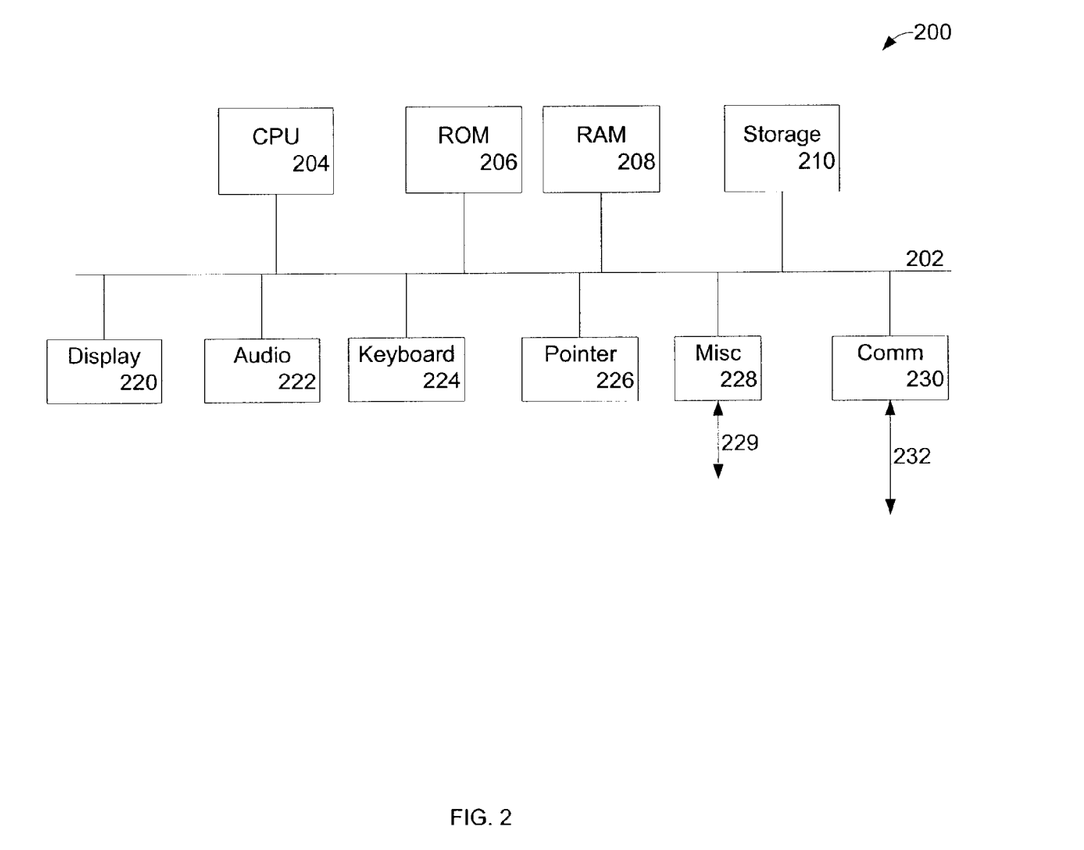
FIG. 2 is a block diagram of a computer system.

FIG. 2 illustrates a computer system 200 in block diagram form, which may be representative of any of the clients and/or servers shown in FIG. 1. More details are described below.

The term IP as used in this document denotes Intellectual Property. The term IP, may be used by itself, or may be used with other terms such as core, to denote a design having a functionality. For example, an IP core or IP for short, may consist of circuitry, buses, communication links, a microprocessor, etc. Additionally, IP may be implemented in a variety of ways, and may be fabricated on an integrated circuit, etc.

The present invention deals with networks. For illustrative purposes, some of the embodiments are detailed in a μNetwork environment.

Figure 3:
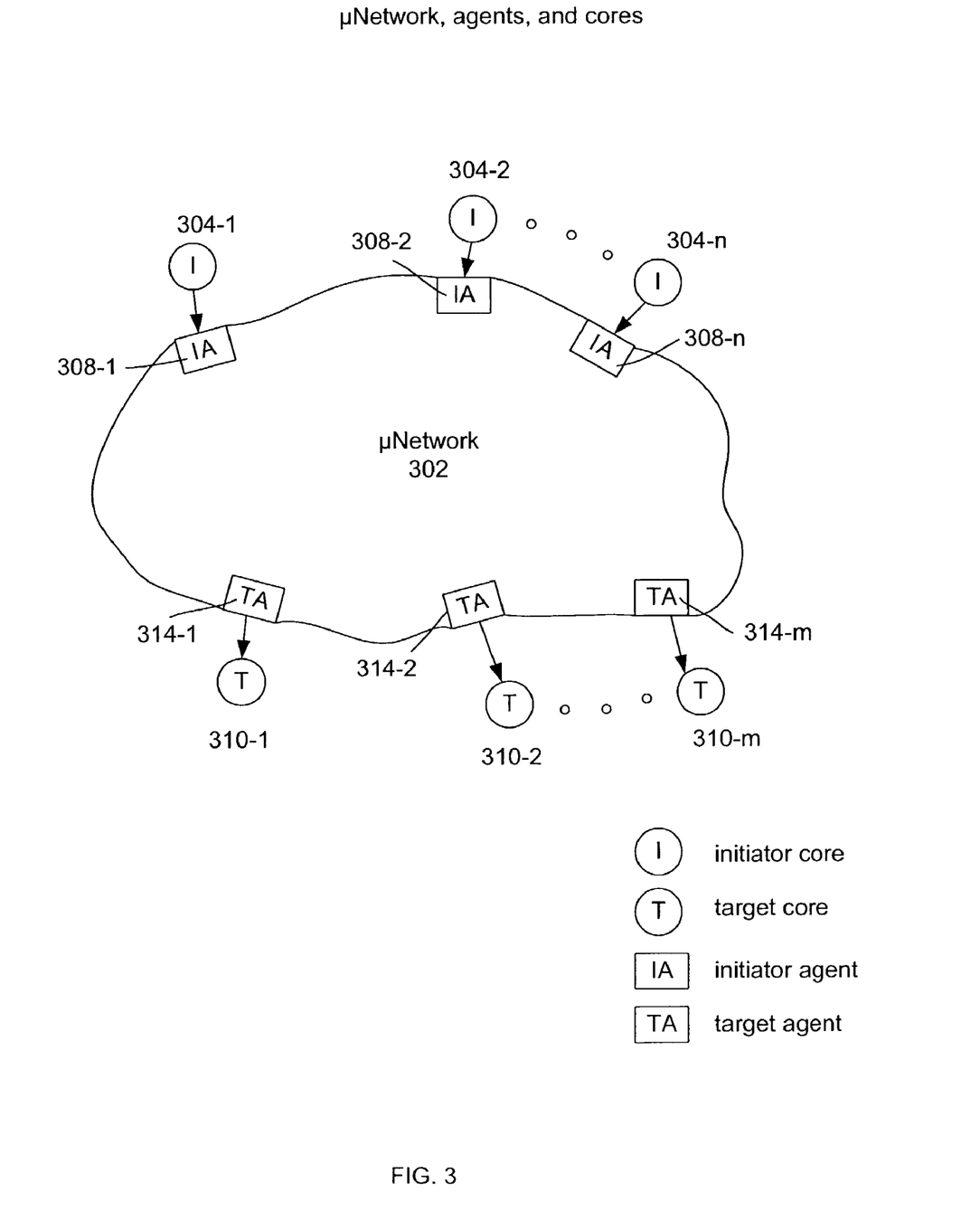
FIG. 3 illustrates one embodiment of the present invention showing a μNetwork, agents, and cores.

FIG. 3 shows a generic μNetwork 302. IP cores (such as 304-1 through 304-n, and 310-1 through 310-m) are classified as either being initiators (such as 304-1 through 304-n) or targets (such as, 310-1 through 310-m), depending on whether they are the source or destination of requests (such as reads and writes). For example, a processor is a typical initiator, whereas a memory system is a typical target. The μNetwork 302 makes use of agents (such as 308-1 through 308-n, and 314-1 through 314-m) at the periphery. The purpose of an agent is to provide a standard interface socket for the core to plug into the μNetwork 302. It may perform a variety of functions, for example, it may translate a point-to-point protocol used in communicating with the core to the internal protocols of the μNetwork 302. It may also isolate the core from the specific details of the μNetwork 302 and of the other cores in the system.

Figure 4:
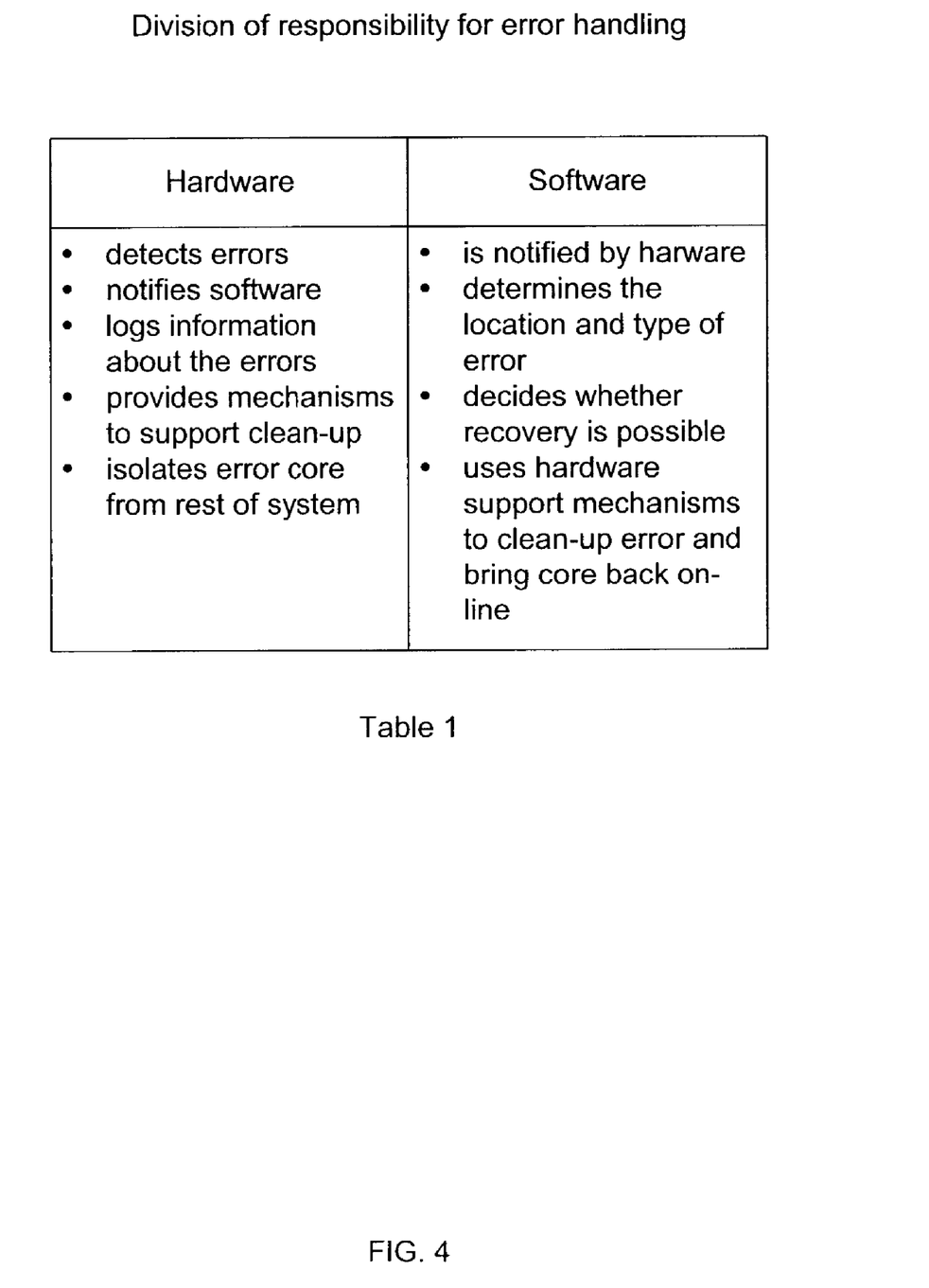
FIG. 4 illustrates one embodiment of the present invention showing a possible division between hardware and software for error handling and recovery.

FIG. 4 illustrates one embodiment of the present invention showing in Table 1 a possible division between hardware and software for error handling and recovery. It may be desirable to have minimal mechanisms in hardware, because they are expensive to design and verify, in addition to taking up space on the final chip. By way of contrast, software algorithms may be better able to deal with complex error recovery tasks, because they are easier to modify to get them correct, or to obtain a desired behavior.

Nonetheless, a minimal amount of support may be needed in hardware. This hardware support falls into two categories: 1) error detection and core isolation, and 2) software error handling support.

Figure 5A:
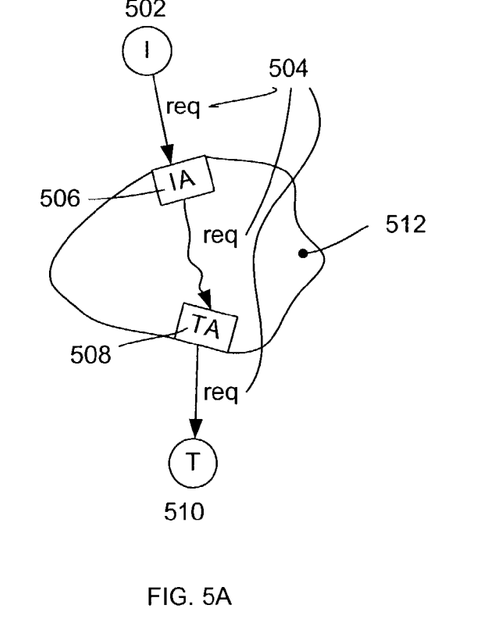
FIG. 5 illustrates one embodiment of the present invention showing an approach taken to assure error isolation.
Figure 5B:
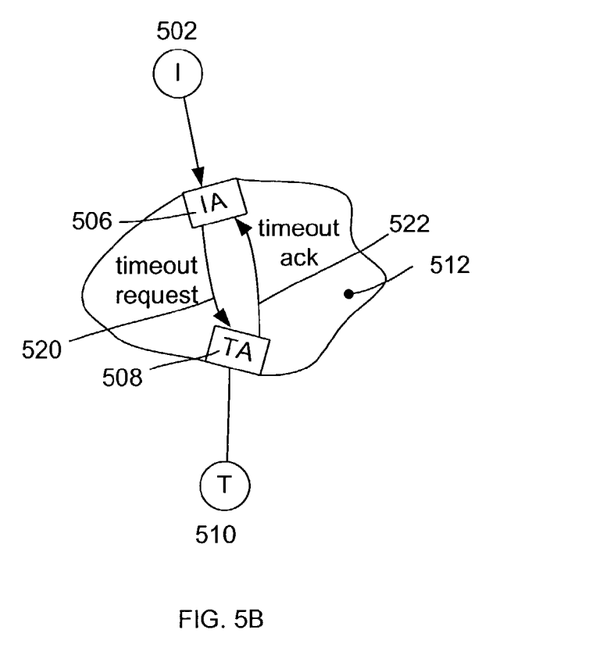
Figure 5C:
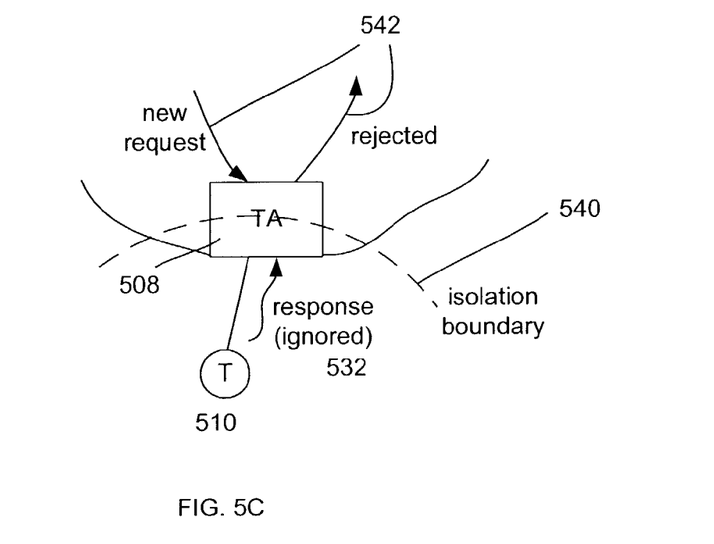

FIG. 5 illustrates one embodiment of the present invention showing an approach taken to assure error isolation. The agent associated with a core may be tasked with detecting core errors and protecting the rest of the system from those errors. In this example, in FIG. 5A, the initiator 502 has sent a request 504 to the target 510 via the initiator agent 506, μNetwork 512, and target agent 508. The target core 510 may have stopped servicing requests and thus never issues the corresponding responses. The initiator of those requests may now be stuck waiting on the responses. The initiating agent (such as 506) and target agents (one such as 508) together decide when the request has been outstanding for too long, and to declare the target core broken. In FIG. 5B the initiating agent 506 sends a timeout request 520, and the target agent 508 replies with a timeout acknowledgement 522, thus allowing the timeout. At this point, as shown in FIG. 5C the target agent 508 isolates the target core 510 from the rest of the system (at the isolation boundary 540). It does not allow any new requests to be issued to that target (actions shown as 542) and drops any responses 532 arriving from the target 510, so that they cannot contaminate the rest of the system.

Figure 6:
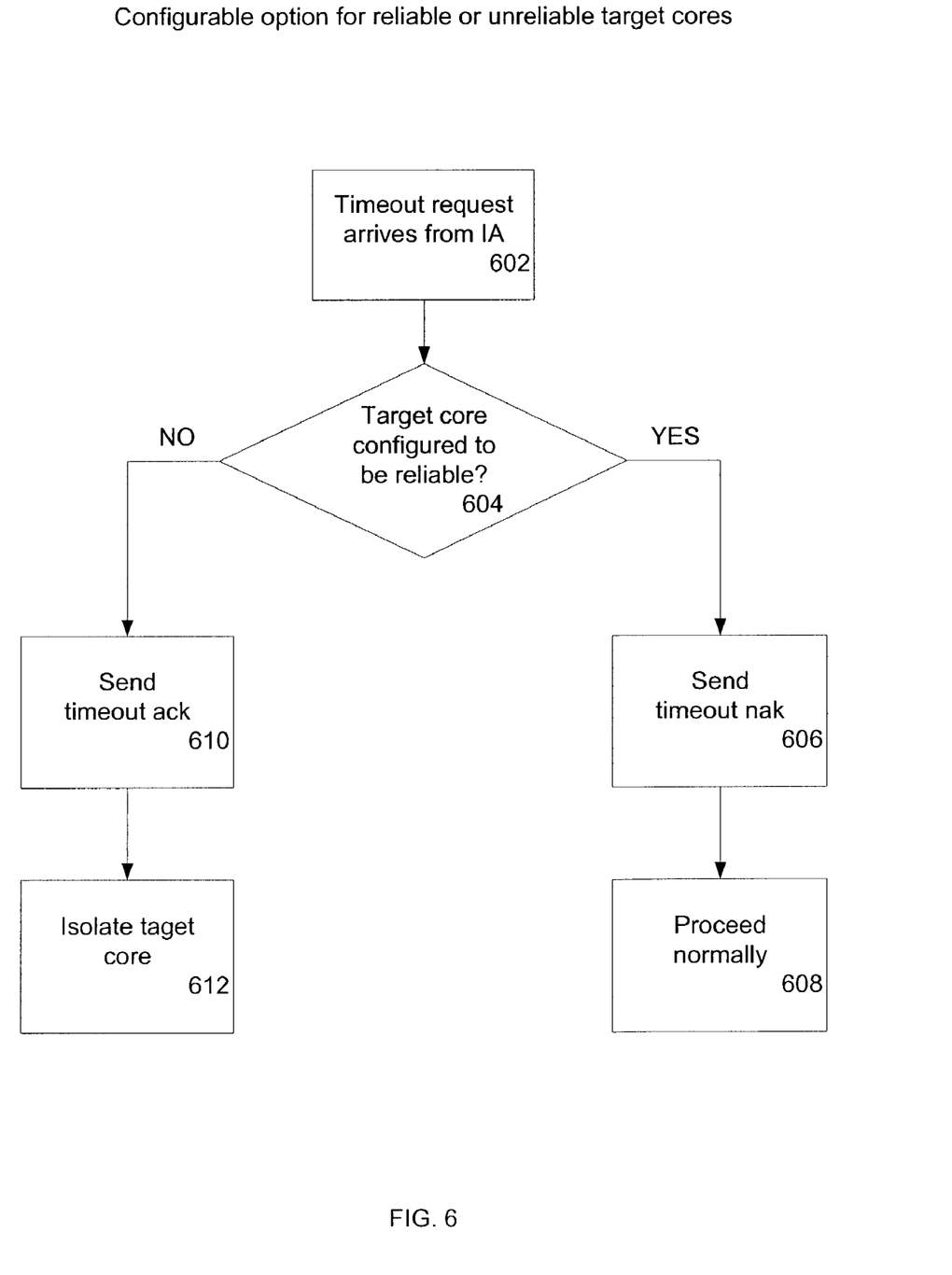
FIG. 6 shows one embodiment of the present invention behavior (in flow chart form) of the target agent.

Detecting a problem in an attached core may involve the use of timeouts in the agents. After a certain amount of time has elapsed without an expected action from the core, the core is declared as broken, and the agent takes some form of action. It is not always easy to figure out the proper timeout interval to use for this kind of timeout mechanism. And in particular, some cores such as simple targets, or bridges to a different interconnect such as a system bus, are considered reliable enough to not require any timeout protection. As part of this invention, the system designer may designate any core to be reliable or not, and thus allow timeouts or not on the corresponding agent. This may be a configuration option that is decided at the time the chip is designed and the result hardwired into the chip. FIG. 6 shows one embodiment of the present invention behavior (in flow chart form) of the target agent. When a timeout interval has been reached 602, the decision 604 is made whether a timeout is allowed for this particular core (path 610 and 612), or not (path 606 and 608). If not (path 606 and 608), the system proceeds normally and the request is eventually completed.

Figure 7:
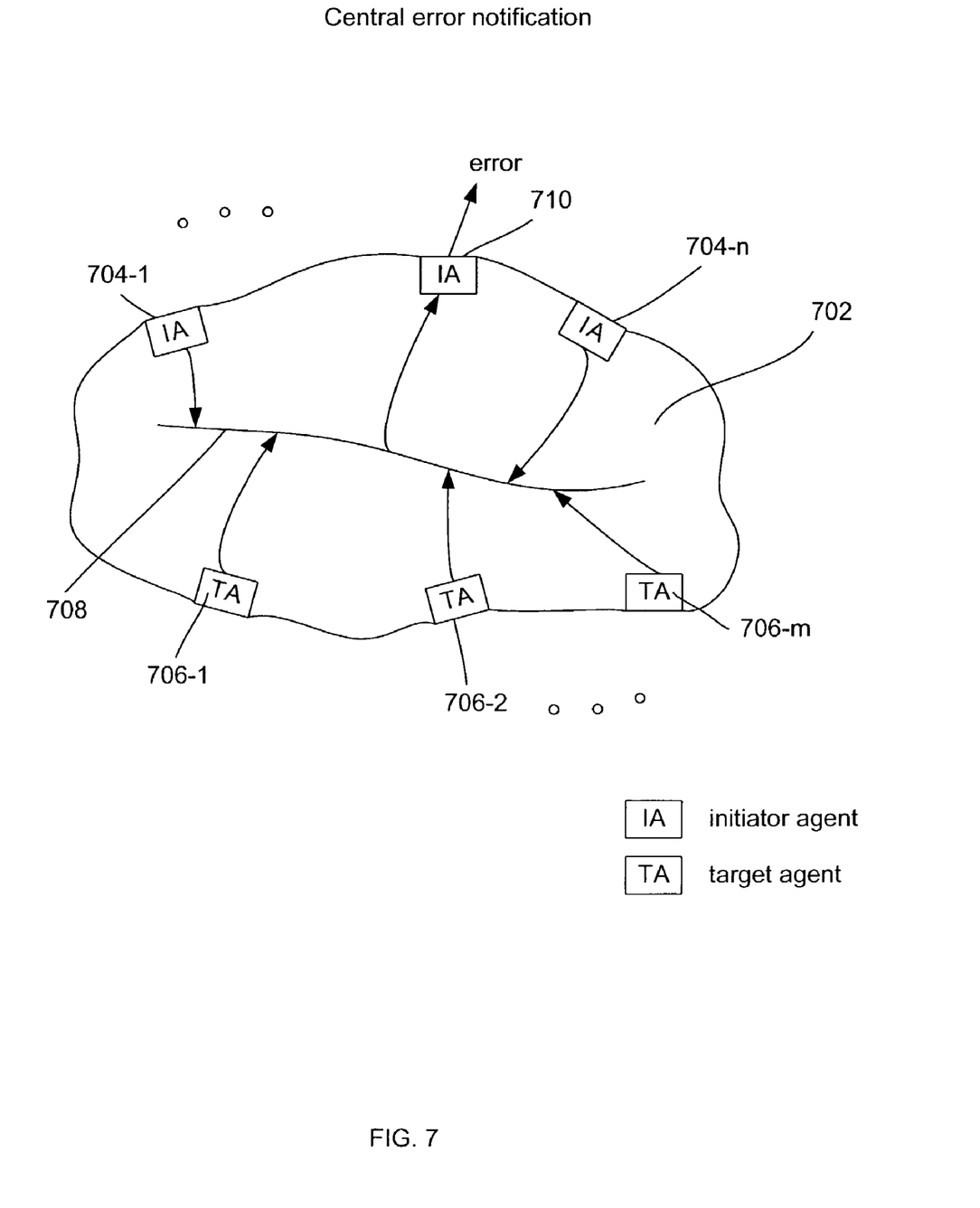
FIG. 7 shows how the error indications from different agents are collected centrally and sent to a specific initiator.

Once an error has been detected, and the agent has isolated the error core from the rest of the system (if needed), system software may be notified of the problem to complete the error handling. FIG. 7 shows how the error indications from different agents (704-1 through 704-n, and 706-1 through 706-m) are collected centrally 708 and sent to a specific initiator 710. The μNetwork 702 may be configurable to allow the user to decide which errors should be reported from each agent (704-1 through 704-n, and 706-1 through 706-m), and which initiator agent (such as 710) to notify of system errors.

Figure 8:
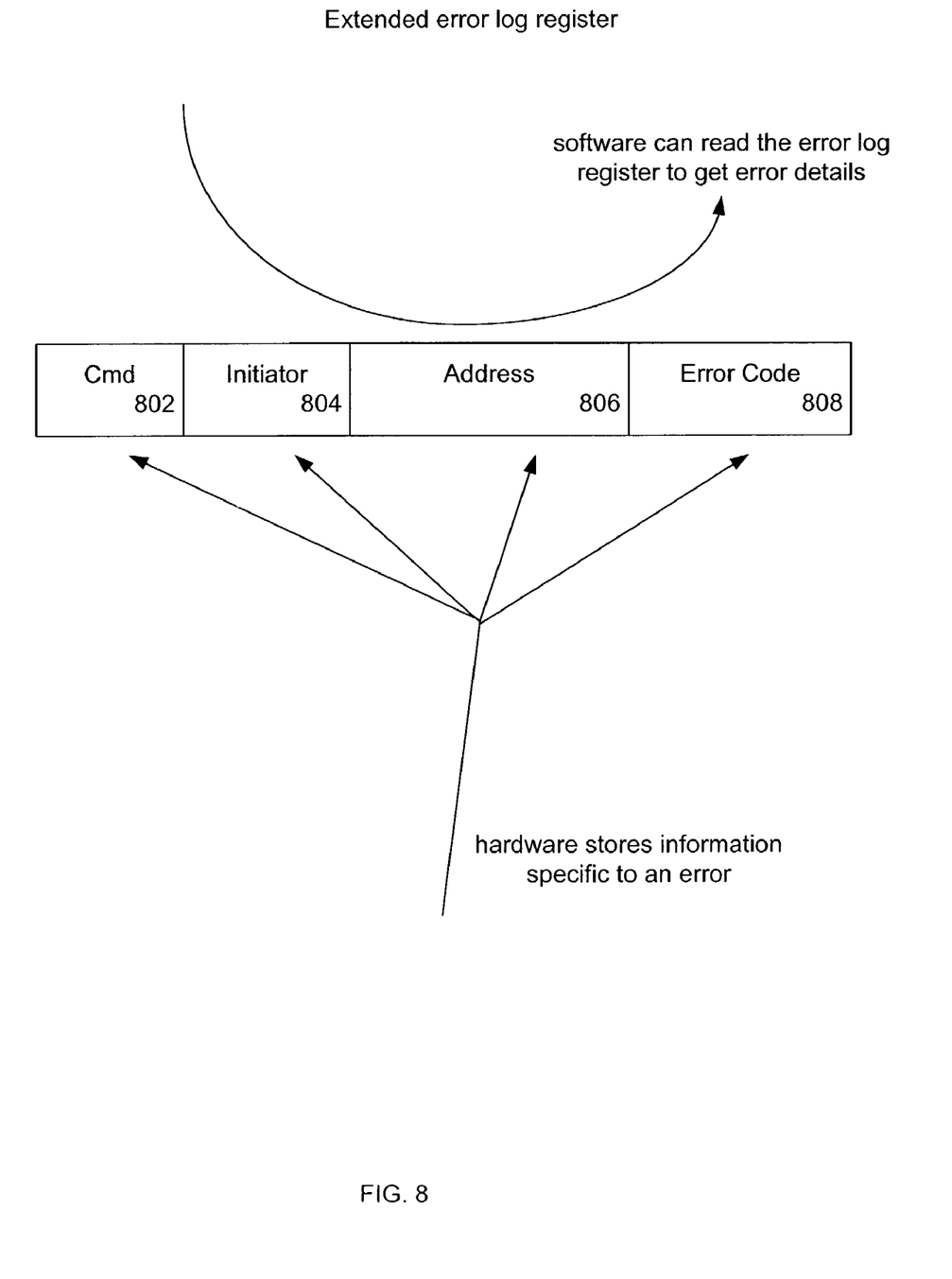
FIG. 8 illustrates one embodiment of the present invention showing how an agent stores away information when an error is discovered.

When an error occurs, information about that error may be logged away in a queue of registers in the detecting agent, so that error handling software may later analyze the problem and understand if and how to affect recovery. FIG. 8 illustrates one embodiment of the present invention showing how an agent stores away information when an error is discovered. In some cases, it is important to log away as much information about the request as possible (such as the command type 802, address 806, initiator ID 804, and type of error 808 encountered), so as to give the error handling software as much information as possible to work with. In other cases, it is more important to conserve hardware and avoid extra error logging storage. Ideally, the system designer can configure as much error logging storage as needed.

Figure 9:
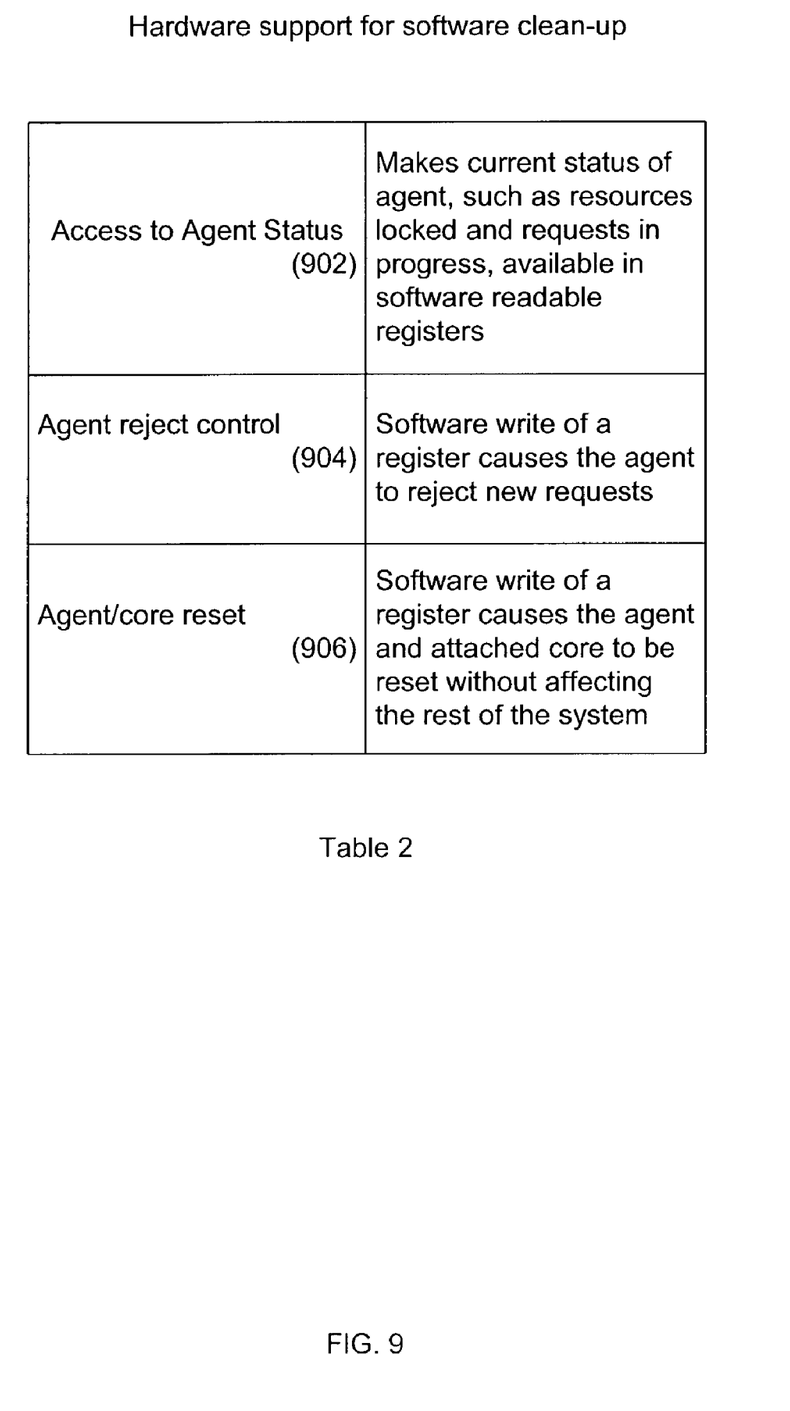
FIG. 9 summarizes one embodiment of the present invention showing clean-up support.

When system software is notified of an error, it may first determine which agent discovered the error and what kind of error has occurred. Some types of errors have left the system in a state that does not need any kind of recovery. But for other types of errors, the agent has isolated the error core from the rest of the system, and system software must perform some amount of clean-up to allow the core to be brought back online with the rest of the system. The agent hardware provides support mechanisms to allow software clean-up. Table 2 in FIG. 9 summarizes one embodiment of the present invention showing this support. There are three major categories: access to current agent status 902, agent reject control (904), and agent/core reset control (906).

Agent status (902) is presented in registers that can be read by system software to discern the current status of the agent. For example, if a resource has been locked by an initiator core, and is never freed, a register shows that a resource is locked and which initiator is responsible for the lock. Another example is to show the activity status of an agent in a register that can be read by system software. This allows system software to see whether any requests are in progress in the agent or attached core, so as to figure out when it is safe to reset the agent and attached core.

Agent reject control (904) is hardware support that allows system software to write a register in an agent and thus cause that agent to no longer accept new requests from the attached core (for initiator agents) or the μNetwork (for target agents). The reject control may be specific to only reject requests that start a new burst sequence of requests, or to generically reject all types of requests. It allows a given agent to be drained of pending requests in preparation for an agent and core reset.

Finally, agent/core reset control (906) is hardware support that allows system software to clean up a portion of an agent and its attached core via a contained reset of just the agent and core hardware, leaving the remainder of the system running. If system software has properly set reject control on the agent and allowed the agent and core to be drained of requests, a reset of a portion of the agent and core can clean up the error in the core, thus allowing the core to be brought back on-line with the rest of the system.

Thus, what has been disclosed is a method and apparatus for error handling in networks.

Referring back to FIG. 1, FIG. 1 illustrates a network environment 100 in which the techniques described may be applied. The network environment 100 has a network 102 that connects S servers 104-1 through 104-S, and C clients 108-1 through 108-C. As shown, several systems in the form of S servers 104-1 through 104-S and C clients 108-1 through 108-C are connected to each other via a network 102, which may be, for example, an on-chip communication network. Note that alternatively the network 102 might be or include one or more of: inter-chip communications, an optical network, the Internet, a Local Area Network (LAN), Wide Area Network (WAN), satellite link, fiber network, cable network, or a combination of these and/or others. The servers may represent, for example: a master device on a chip; a memory; an intellectual property core, such as a microprocessor, communications interface, etc.; a disk storage system; and/or computing resources. Likewise, the clients may have computing, storage, and viewing capabilities. The method and apparatus described herein may be applied to essentially any type of communicating means or device whether local or remote, such as a LAN, a WAN, a system bus, on-chip bus, etc. It is to be further appreciated that the use of the term client and server is for clarity in specifying who initiates a communication (the client) and who responds (the server). No hierarchy is implied unless explicitly stated. Both functions may be in a single communicating device, in which case the client-server and server-client relationship may be viewed as peer-to-peer. Thus, if two devices such as 108-1 and 104-S can both initiate and respond to communications, their communication may be viewed as peer-to-peer. Likewise, communications between 104-1 and 104-S, and 108-1 and 108-C may be viewed as peer to peer if each such communicating device is capable of initiation and response to communication.

Referring back to FIG. 2, FIG. 2 illustrates a system 200 in block diagram form, which may be representative of any of the clients and/or servers shown in FIG. 1. The block diagram is a high level conceptual representation and may be implemented in a variety of ways and by various architectures. Bus system 202 interconnects a Central Processing Unit (CPU) 204, Read Only Memory (ROM) 206, Random Access Memory (RAM) 208, storage 210, display 220, audio, 222, keyboard 224, pointer 226, miscellaneous input/output (I/O) devices 228, and communications 230. The bus system 202 may be for example, one or more of such buses as an on-chip bus, a system bus, Peripheral Component Interconnect (PCI), Advanced Graphics Port (AGP), Small Computer System Interface (SCSI), Institute of Electrical and Electronics Engineers (IEEE) standard number 1394 (FireWire), Universal Serial Bus (USB), etc. The CPU 204 may be a single, multiple, or even a distributed computing resource. Storage 210, may be Compact Disc (CD), Digital Versatile Disk (DVD), hard disks (HD), optical disks, tape, flash, memory sticks, video recorders, etc. Display 220 might be, for example, a Cathode Ray Tube (CRT), Liquid Crystal Display (LCD), a projection system, Television (TV), etc. Note that depending upon the actual implementation of the system, the system may include some, all, more, or a rearrangement of components in the block diagram. For example, an on-chip communications system on an integrated circuit may lack a display 220, keyboard 224, and a pointer 226. Another example may be a thin client might consist of a wireless hand held device that lacks, for example, a traditional keyboard. Thus, many variations on the system of FIG. 2 are possible.

For purposes of discussing and understanding the invention, it is to be understood that various terms are used by those knowledgeable in the art to describe techniques and approaches. Furthermore, in the description, for purposes of explanation, numerous specific details are set forth in order to provide a thorough understanding of the present invention. It will be evident, however, to one of ordinary skill in the art that the present invention may be practiced without these specific details. In some instances, well-known structures and devices are shown in block diagram form, rather than in detail, in order to avoid obscuring the present invention. These embodiments are described in sufficient detail to enable those of ordinary skill in the art to practice the invention, and it is to be understood that other embodiments may be utilized and that logical, mechanical, electrical, and other changes may be made without departing from the scope of the present invention.

Some portions of the description may be presented in terms of algorithms and symbolic representations of operations on, for example, data bits within a computer memory. These algorithmic descriptions and representations are the means used by those of ordinary skill in the data processing arts to most effectively convey the substance of their work to others of ordinary skill in the art. An algorithm is here, and generally, conceived to be a self-consistent sequence of acts leading to a desired result. The acts are those requiring physical manipulations of physical quantities. Usually, though not necessarily, these quantities take the form of electrical, magnetic, or optical signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the discussion, it is appreciated that throughout the description, discussions utilizing terms such as "processing" or "computing" or "calculating" or "determining" or "communicating" or "displaying" or the like, can refer to the action and processes of a computer system, or an electronic device, that manipulates and transforms data represented as physical (electronic) quantities within the electronic device or computer system's registers and memories into other data similarly represented as physical quantities within the electronic device and/or computer system memories or registers or other such information storage, transmission, or display devices.

The present invention can be implemented by an apparatus for performing the operations herein. This apparatus may be specially constructed for the required purposes, or it may comprise a general-purpose computer, selectively activated or reconfigured by a computer program stored in the computer. Such a computer program may be stored in a computer readable storage medium, such as, but not limited to, any type of disk including floppy disks, hard disks, optical disks, compact disk-read only memories (CD-ROMs), digital versatile disk (DVD), and magnetic-optical disks, read-only memories (ROMs), random access memories (RAMs), electrically programmable read-only memories (EPROM)s, electrically erasable programmable read-only memories (EEPROMs), FLASH memories, magnetic or optical cards, etc., or any type of media suitable for storing electronic instructions either local to the computer or remote to the computer.

The algorithms and displays presented herein are not inherently related to any particular computer or other apparatus. Various general purpose systems may be used with programs in accordance with the teachings herein, or it may prove convenient to construct more specialized apparatus to perform the required method. For example, any of the methods according to the present invention can be implemented in hard-wired circuitry, by programming a general-purpose processor, or by any combination of hardware and software. One of ordinary skill in the art will immediately appreciate that the invention can be practiced with computer system configurations other than those described, including hand-held devices, multiprocessor systems, microprocessor-based or programmable consumer electronics, digital signal processing (DSP) devices, set top boxes, network PCs, minicomputers, mainframe computers, and the like. The invention can also be practiced in distributed computing environments where tasks are performed by remote processing devices that are linked through a communications network. This communications network is not limited by size, and may range from, for example, on-chip communications to WANs such as the Internet.

The methods of the invention may be implemented using computer software. If written in a programming language conforming to a recognized standard, sequences of instructions designed to implement the methods can be compiled for execution on a variety of hardware platforms and for interface to a variety of operating systems. It will be appreciated that a variety of programming languages may be used to implement the teachings of the invention as described herein. Furthermore, it is common in the art to speak of software, in one form or another (e.g., program, procedure, application, driver, . . . ), as taking an action or causing a result. Such expressions are merely a shorthand way of saying that execution of the software by a computer causes the processor of the computer to perform an action or produce a result.

It is to be understood that various terms and techniques are used by those knowledgeable in the art to describe communications, protocols, applications, implementations, mechanisms, etc. One such technique is the description of an implementation of a technique in terms of an algorithm or mathematical expression. That is, while the technique may be, for example, implemented as executing code on a computer, the expression of that technique may be more aptly and succinctly conveyed and communicated as a formula, algorithm, or mathematical expression. Thus, one of ordinary skill in the art would recognize a block denoting A+B=C as an additive function whose implementation in hardware and/or software would take two inputs (A and B) and produce a summation output (C). Thus, the use of formula, algorithm, or mathematical expression as descriptions is to be understood as having a physical embodiment in at least hardware and/or software (such as a computer system in which the techniques of the present invention may be practiced as well as implemented as an embodiment).

A machine-readable medium is understood to include any mechanism for storing or transmitting information in a form readable by a machine (e.g., a computer). For example, a machine-readable medium includes read only memory (ROM); random access memory (RAM); magnetic disk storage media; optical storage media; flash memory devices; electrical, optical, acoustical, or other form of propagated signals (e.g., carrier waves, infrared signals, digital signals, etc.); etc.

Thus, a method and apparatus for error handling in Networks have been described.

What is claimed is:

1. A method comprising:
    detecting one or more errors in a first core located within a system on a chip that has a plurality of cores and agents including the first core;
    referencing a predefined classification of the first core configured at design time to determine if the first core requires isolation based on the detected one or more errors:
    isolating the first core with detected errors if required by the predefined classification from other cores within that system on the chip; and
    removing the first core with detected errors from isolation when the one or more errors in the first core are corrected.

2. The method of claim 1 wherein isolating the first core further comprises isolation via an agent for the first core.

3. The method of claim 2 wherein isolation via an agent for the first core is performed in hardware and or firmware.

4. The method of claim 1 wherein detecting one or more errors in a core further comprises one or more agents not an agent for said core detecting said one or more errors in said core.

5. The method of claim 1 wherein detecting one or more errors in a core comprises determining that said core has violated a protocol used between said core and an agent for said core.

6. The method of claim 1 wherein detecting one or more errors in a core comprises determining that said core has not responded within a predetermined time period.

7. The method of claim 1 further comprising creating one or more entities associated with said one or more errors in the first core.

8. The method of claim 7 wherein said one or more entities allows access to information selected from the group consisting of command, initiator, address, and error code.

9. The method of claim 7 wherein said creating one or more entities further comprises creating one or more entries in an error log.

10. The method of claim 9 wherein said error log has a size determined from the group consisting of fixed at design time, static during operation of the first core, and dynamically variable during operation of the first core.

11. The method of claim 9 wherein said error log is located at a location selected from the group consisting of fixed at design time, static during operation of said core, dynamically variable during operation of the first core, within the first core, and external to the first core.

12. The method of claim 1 wherein the first core has a control entity allowing access to status signals and/or control signals selected from the group consisting of port lock status, busy status, reject control, clean-up control, agent status, agent reject control, agent reset, core reset, resources locked, and requests in progress.

13. The method of claim 12 wherein said agent status signal provides information selected from the group consisting of resources locked, port lock status, busy status, and requests in progress.

14. The method of claim 12 wherein said agent reject control signal when asserted causes an agent to reject new requests to said agent.

15. The method of claim 12 wherein said agent reset and said core reset signal when asserted causes a respective agent and said core to be reset without affecting other than said respective agent and core.

16. A processing system comprising a processor, which when executing a set of instructions causes the processing system to perform the method of claim 1.

17. A machine-readable medium having stored thereon instructions, which when executed causes a machine to perform the method of claim 1.

18. An apparatus comprising:
    a plurality of cores located within a system on a chip, each core having a communication link;
    a plurality of agents located within that system on the chip, each agent having a first link and a second link, the first link of each agent coupled to a respective communication link of a specific core, the second link of each agent coupled to the second link of other agents via a network; and
    an error reporting agent having an input and an output, the input coupled to said network, and the output coupled to transmit a signal, wherein the error reporting agent to isolate a first core with detected errors, if required by a predefined classification determined at design time, from other cores within that system on the chip by sending a signal to a first agent to no longer accept new requests from a first core coupled to the first link of the first agent or accept requests from other agents located within that system on the chip, which couple to the second link of the first agent.

19. The apparatus of claim 18 wherein said signal is an error signal indicating a condition selected from the group consisting of that one or more of said plurality of cores has been isolated, that one or more of said plurality of cores has an error, and that an error has occurred in said network.

20. The apparatus of claim 18 wherein each core is predefined as a reliable or non-reliable core based on the predefined classification determined at design time.

21. An method comprising:
    configuring a plurality of cores located within a system on a chip, each of said cores connected with and associated with each of one of a plurality of initiators;
    connecting one or more of said plurality of initiators to a network located within said system on the chip;
    one or more of said plurality of initiators to determine an error in one or more said cores;
    communicating said error to the other initiators located within said system on the; chip; isolating one or more cores based on said error, if required by a predefined classification determined at design time;

storing information related to said error;

controlling said one or more isolated cores; and removing said one or more isolated cores from isolation when said error is corrected.

22. A machine-readable medium having stored thereon instructions, which when executed, to generate a representation of an apparatus to perform the method of claim 21.

23. A method comprising;

receiving a timeout request from an initiator;

determining if said timeout request is targeted to a reliable or unreliable core based on a predefined classification determined at design time located within a system on a chip; and if targeted to a reliable core sending a timeout non-acknowledgement to said timeout request and proceeding normally;

else sending a timeout acknowledgement to said timeout request, isolating said core from other cores within that system on the chip, and removing said core from isolation when one or more errors in said core are corrected.

24. The method of claim 23 wherein said reliable or unreliable core is determined at a point in time prior to operation of said reliable or unreliable core.

* * * * *